(12) United States Patent
Stuhlfauth et al.

(10) Patent No.: US 12,532,199 B2
(45) Date of Patent: Jan. 20, 2026

(54) METHOD AND SYSTEM FOR TESTING A PERFORMANCE OF A MULTI-LINK COMMUNICATION SYSTEM

(71) Applicant: Rohde & Schwarz GmbH & Co. KG, Munich (DE)

(72) Inventors: Reiner Stuhlfauth, Landau (DE); Lucas Chavarria-Gimenez, Aalborg (DK); Daniela Raddino, Munich (DE); Rabih El-Masri, Munich (DE); Sandra Merkel, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 331 days.

(21) Appl. No.: 18/225,639

(22) Filed: Jul. 24, 2023

(65) Prior Publication Data

US 2025/0039706 A1 Jan. 30, 2025

(51) Int. Cl.
*H04W 24/00* (2009.01)
*H04B 7/185* (2006.01)
*H04L 43/0852* (2022.01)
*H04L 43/50* (2022.01)
*H04W 24/08* (2009.01)

(52) U.S. Cl.
CPC ........ *H04W 24/08* (2013.01); *H04B 7/18513* (2013.01)

(58) Field of Classification Search
None
See application file for complete search history.

(56) References Cited

U.S. PATENT DOCUMENTS

| 2022/0225119 | A1 | 7/2022 | Liberg et al. |
| 2023/0403071 | A1* | 12/2023 | Chen .................. H04L 27/3405 |
| 2025/0168786 | A1* | 5/2025 | Medeiros De Amorim ................ H04W 56/001 |

OTHER PUBLICATIONS

David et al. (Satellite Communications Data Link Solution for Long Term Air Traffic Management, Nov. 25-27, 2014) (Year: 2014).*

* cited by examiner

*Primary Examiner* — Maharishi V Khirodhar
(74) *Attorney, Agent, or Firm* — Westman, Champlin & Koehler, P.A.

(57) ABSTRACT

A test system for testing performance of a multi-link communication system including at least one non-terrestrial network (NTN) communication link. The system comprises an encoding and compression stage to process transmission data at a signal transmission side of the test system by emulating different encoding and compression schemes to provide encoded and compressed transmission data converted into radio frequency, RF, signals transferred via communication links of the communication system to a terrestrial wireless device at a signal reception side of the test system. The system further comprises a decoding and decompression stage to apply corresponding decoding and decompression schemes to sampled RF signals to provide reception data at the signal reception side of the system and a data analysing unit adapted to analyse a performance of the communication system by evaluating the reception data provided by the decoding and decompression stage of the system.

20 Claims, 5 Drawing Sheets

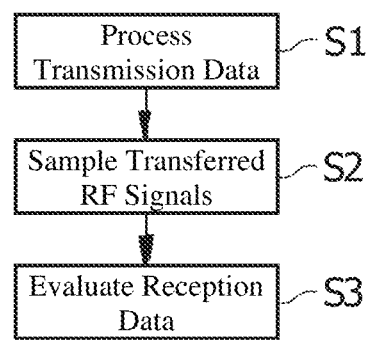

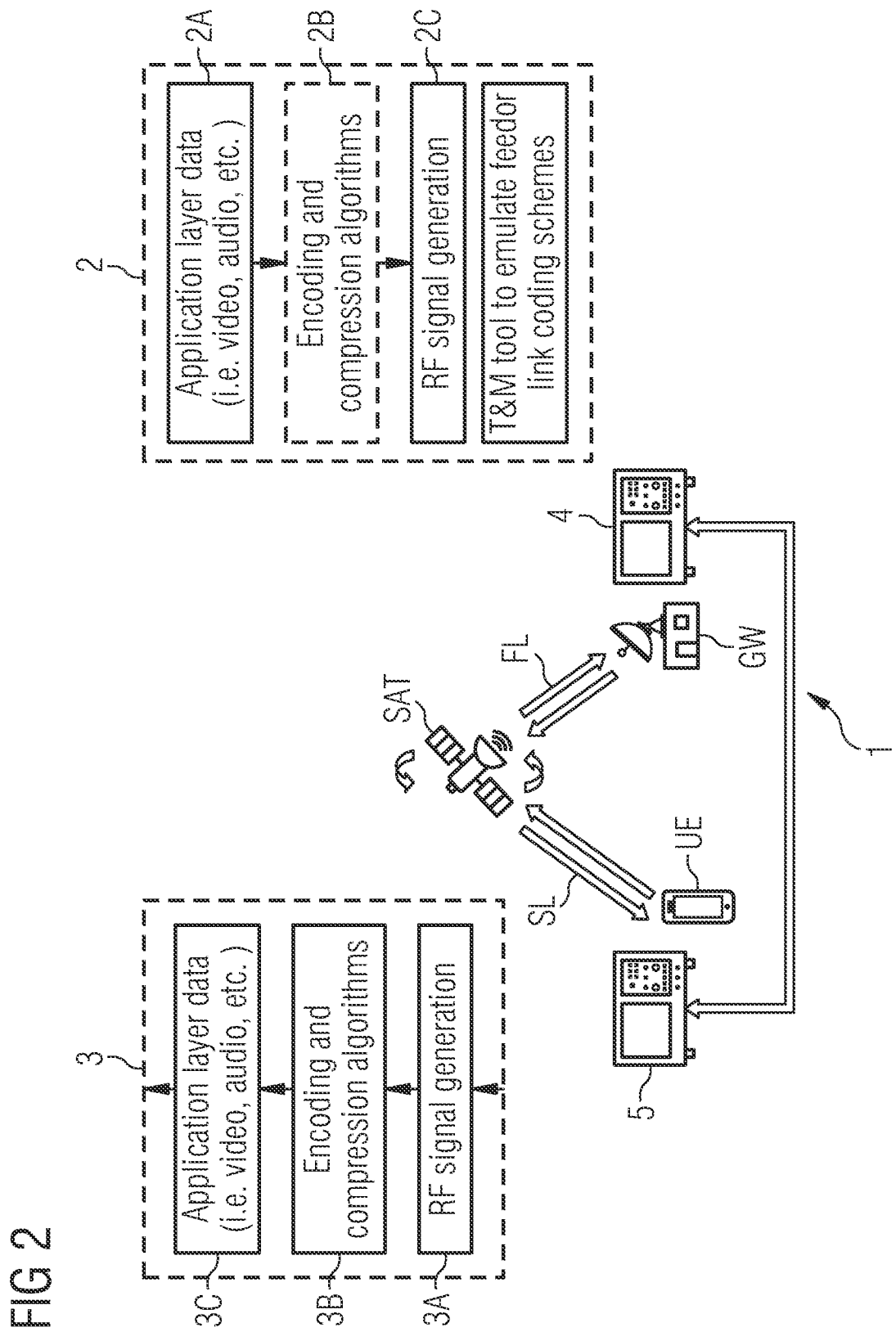

METHOD AND SYSTEM FOR TESTING A PERFORMANCE OF A MULTI-LINK COMMUNICATION SYSTEM

TECHNICAL FIELD

The invention relates to a method and system for testing a performance of a multi-link communication system and in particular to a verification of encoding and compression processes applied in a satellite access node.

TECHNICAL BACKGROUND

Terrestrial communication relies on earth-based infrastructure like cables and cellular networks, offering high data rates and low latency over shorter distances. Satellite communication, on the other hand, provides wide coverage but introduces higher latency and higher infrastructure costs. Terrestrial communication is limited by geography, while satellite communication overcomes geographical constraints.

A non-terrestrial networks NTNs can encompass various wireless communication systems operating above the earth's surface, including satellites in low earth orbit (LEO), medium earth orbit (MEO) and geostationary orbit (GEO), as well as high-altitude platforms (HAPS) and drones. NTN has two main aspects: NTN-IoT, which expands IoT coverage globally at GEO and LEO altitudes, and NTN-NR, which directly links smartphones and 5G devices at LEO altitude, providing low-data services, voice and messaging for diverse use cases.

With the introduction of non-terrestrial networks NTN and the further evolution to regenerative payload where more and more processing is incorporated in the satellite access node (SAN) some situations reveal communication links providing different quality of service.

The NTN architecture, especially the split into a feeder link FL between a terrestrial gateway GW and a satellite, an inter-satellite link ISL between two satellites and a serving link SL between a satellite and a terrestrial user equipment UE reveals different links providing different quality. The feeder link FL forms a high quality link as the satellite position of the satellite is known and RF affects like Doppler, time and path loss can be mitigated mostly. The inter-satellite link ISL faces atmospheric interferences and requires re-establishment dynamically. The serving link SL normally faces a low bandwidth, a high path attenuation, Doppler effects and time delays.

As signal processing is incorporated more and more in the satellite itself, some mechanisms may be employed to counter the effects of efficient resource usage with still a high level or QoE in the E2E connection. A dynamic data encoding based on the link quality can be performed. This is also known as adaptive modulation and coding. Further a dynamic data compression can be performed. Data can be adjusted to an available link throughput. It can be necessary to combine a high data rate with a low data rate channel in a daisy-chain connection. Further a dynamic data separation or data duplication across multiple links can be performed, e.g., an inter satellite link ISL and a feeder link FL in parallel or an inter satellite link ISL and a serving link SL via a second satellite. A receiver entity can be provided to combine and forward the data.

NTN networks can employ optimization of data and network resilience, i.e., a data link is copied and transferred over multiple, statistically independent links. Each link can comprise different characteristics such as fading, bandwidth, latency and attenuation. From conventional wireless networks carrier aggregation is known, where data is sent over multiple carriers derived from the same transmission reception point (TRP). Further dual connectivity can be provided in conventional wireless networks, where data is aggregated over multiple TRP but belonging to the same RAT-Networks may represent a multi-RAT transmission concept, where multiple links can be aggregated but where each link represents a different RAT and therefore different coding, compression and link adaptation mechanisms.

Accordingly, there is a need to provide a test method and test system where different multi-link scenarios can be emulated to verify a sufficient performance and data quality.

SUMMARY

The invention provides according to a first aspect a method for testing a performance of a multi-link communication system having multiple communication links including at least one non-terrestrial network (NTN) communication link, wherein the method comprises the steps of:
  processing transmission data at a signal transmission side by emulating different encoding and compression schemes to provide encoded and compressed transmission data converted into radio frequency, RF, signals transferred via communication links of the multi-link communication system to a terrestrial wireless device at a signal reception side;
  sampling the transferred RF signals at the signal reception side and applying corresponding decoding and decompression schemes to provide reception data; and
  analysing a performance of the multi-link communication system by evaluating the provided reception data.

In a possible embodiment of the method analysing a performance of the multi-link communication system is performed by evaluating predefined quality metrics of the reception data.

In a possible embodiment of the method analysing a performance of the multi-link communication system wherein analysing a performance of the multi-link communication system is performed by evaluating predefined quality metrics of the reception data.

In a possible embodiment of the method analysing a performance of the multi-link communication system the evaluated quality metrics comprise a data throughput, a block error rate, a latency and a Mean Opinion Score (MOS).

In a possible embodiment of the method analysing a performance of the multi-link communication system the non-terrestrial network (NTN) communication link of the multi-link communication system comprises a feeder link (FL) provided between a terrestrial gateway at the signal transmission side and a satellite and comprises a serving link (SL) between the satellite and the terrestrial wireless device at the signal reception side.

In a possible embodiment of the method analysing a performance of the multi-link communication system the non-terrestrial network (NTN) communication link of the multi-link communication system comprises at least one inter-satellite link (ISL) between a pair of satellites of the non-terrestrial network (NTN) communication link.

In a possible embodiment of the method analysing a performance of the multi-link communication system both the feeder link (FL) and the serving link (SL) of the non-terrestrial network (NTN) communication link comprise an uplink (UL) and a downlink (DL) respectively.

In a possible embodiment of the method analysing a performance of the multi-link communication system the satellite of the non-terrestrial network (NTN) communication link of the multi-link communication system provides a regenerative payload performing signal processing including demodulation of the RF-signal received via the feeder link (FL), decoding of the demodulated RF-signal, re-encoding of the decoded signal and re-modulation the re-encoded signal transmitted via the serving link (SL) to the terrestrial wireless device at the signal reception side.

In a possible embodiment of the method analysing a performance of the multi-link communication system the communication links of the multi-link communication system comprise terrestrial network (TN) communication links and non-terrestrial network (NTN) communication links.

In a possible embodiment of the method analysing a performance of the multi-link communication system wherein for each communication link of the multi-link communication system a different encoding and compression scheme is applied to the transmission data.

In a possible embodiment of the method analysing a performance of the multi-link communication system each communication link of the multi-link communication system comprises different communication link characteristics.

In a possible embodiment of the method analysing a performance of the multi-link communication system the communication link characteristics of a communication link comprise fading characteristics, bandwidth characteristics, latency characteristics and attenuation characteristics.

In a possible embodiment of the method analysing a performance of the multi-link communication system the transmission data comprises application layer data provided by a data application server.

In a possible embodiment of the method analysing a performance of the multi-link communication system the application layer data comprises video data and/or audio data.

In a possible embodiment of the method analysing a performance of the multi-link communication system the applied encoding and compression schemes are executed by an encoding and compression stage at the signal transmission side.

In a possible embodiment of the method analysing a performance of the multi-link communication system the encoding and compression schemes applied for different communication links of the multi-link communication system are configured by user.

In a possible embodiment of the method analysing a performance of the multi-link communication system the applied decoding and decompression schemes are executed by a decoding and decompression stage at the signal reception side.

In a possible embodiment of the method analysing a performance of the multi-link communication system the encoded and compressed transmission data is distributed and transferred simultaneously as RF-signals over multiple independent communications links and/or multiple independent channels.

In a possible embodiment of the method analysing a performance of the multi-link communication system the independent channels are separated in the frequency domain or in the time domain.

The invention further provides according to a second aspect a test system for testing a performance of a multi-link communication system having multiple communication links including at least one non-terrestrial network (NTN) communication link, said test system comprising:

an encoding and compression stage adapted to process transmission data at a signal transmission side of the test system by emulating different encoding and compression schemes to provide encoded and compressed transmission data converted into radio frequency, RF, signals transferred via communication links of the multi-link communication system to a terrestrial wireless device at a signal reception side of the test system;

a decoding and decompression stage adapted to apply corresponding decoding and decompression schemes to sampled RF signals to provide reception data at the signal reception side of the test system; and a data analysing unit adapted to analyse a performance of the multi-link communication system by evaluating the reception data provided by the decoding and decompression stage of the test system.

The invention further provides according to a third aspect a test tool used for testing a performance of a multi-link communication system having multiple communication links including at least one non-terrestrial network (NTN) communication link, wherein the test tool performs the steps of:

processing transmission data at a signal transmission side by emulating different encoding and compression schemes to provide encoded and compressed transmission data converted into radio frequency, RF, signals transferred via communication links of the multi-link communication system to a terrestrial wireless device at a signal reception side;

sampling the transferred RF signals at the signal reception side and applying corresponding decoding and decompression schemes to provide reception data; and analysing a performance of the multi-link communication system by evaluating the provided reception data.

BRIEF DESCRIPTION OF THE DRAWINGS

Different aspects of the present invention are described in more detail with reference to the enclosed figures.

FIG. 1 shows a schematic flowchart of a test method according to an aspect of the present invention;

FIG. 2 shows a schematic diagram for illustrating a possible exemplary embodiment of a test system according to a further aspect of the present invention;

DETAILED DESCRIPTION OF EMBODIMENTS

Figure 3A:
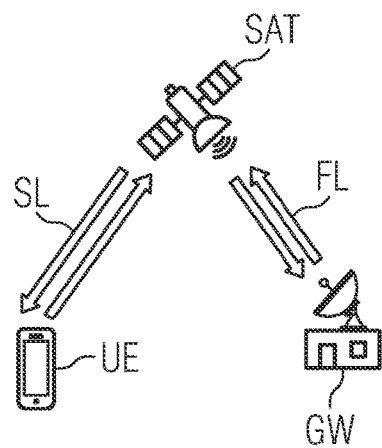
FIGS. 3A to 3D illustrate possible scenarios of using multiple communication links in a multi-link communication system.

As can be seen in the flowchart of FIG. 1 the invention provides according to a first aspect a method for testing a performance of a multi-link communication system comprising several main steps. The multi-link communication system comprises multiple communication links including at least one non-terrestrial network (NTN) communication link.

The test method illustrated in the flowchart of FIG. 1 comprises three main steps S1, S2, S3.

In a first step S1 transmission data is processed at a signal transmission side by emulating different encoding and compression schemes to provide encoded and compressed transmission data. The applied emulation comprises a process of imitating an encoding and/or compression scheme on a test program or platform belonging to the test system.

The supplied transmission data can comprise application layer data provided by a data application server. The application layer data can comprise video data and/or audio data.

The encoded and compressed data is the converted into radio frequency, RF, signals transferred via communication links of the multi-link communication system to a terrestrial wireless device at a signal reception side.

In a preferred embodiment for each communication link of the multi-link communication system a different encoding and compression scheme is applied in step S1 to the supplied transmission data. The encoding and compression schemes applied in step S1 are executed in a possible embodiment by an encoding and compression stage at the signal transmission side. The encoding and compression schemes applied for different communication links of the multi-link communication system can in a possible embodiment be configured by a user.

In a second step S2 illustrated in FIG. 1 the transferred RF signals are sampled at the signal reception side and then corresponding decoding and decompression schemes are applied to provide reception data. The decoding and decompression schemes applied in step S2 can be executed by a decoding and decompression stage at the signal reception side.

In a third step S3 illustrated in FIG. 1 a performance of the multi-link communication system is analysed by evaluating the provided reception data. The performance of the multi-link communication system can be analysed by evaluating predefined quality metrics of the reception data. The evaluated quality metrics comprise for instance a data throughput, a block error rate, a latency and a Mean Opinion Score (MOS). MOS VoIP is a metric used to measure voice quality in VoIP calls. It's a diagnostic metric used to identify and fix quality issues, and can be used to compare different VoIP service providers.

In a possible embodiment of the method analysing a performance of the multi-link communication system the non-terrestrial network (NTN) communication link of the multi-link communication system comprises a feeder link FL provided between a terrestrial gateway GW at the signal transmission side and a satellite and comprises a serving link SL between the satellite SAT and the terrestrial wireless device UE at the signal reception side. Both the feeder link FL and the serving link SL of the non-terrestrial network (NTN) communication link can comprise an uplink UL and a downlink DL respectively as shown in FIG. 2 and in FIGS. 3A to 3D.

Figure 3B:
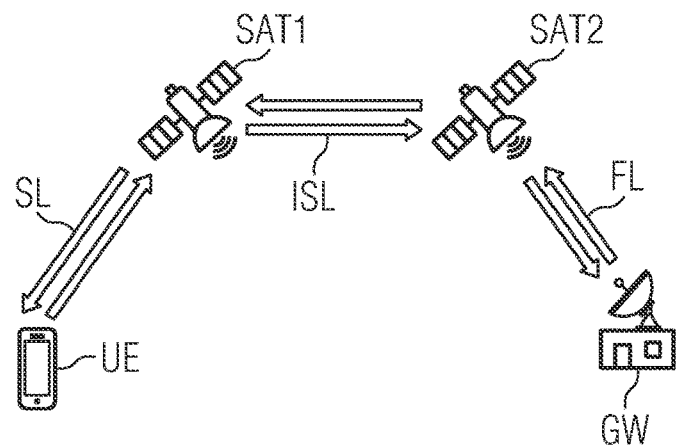

The non-terrestrial network (NTN) communication link of the multi-link communication system can also comprise at least one inter-satellite link ISL between a pair of satellites SAT1, SAT2 of the non-terrestrial network (NTN) communication link as illustrated in FIG. 3B.

In a possible embodiment the satellite of the non-terrestrial network (NTN) communication link of the multi-link communication system provides a regenerative payload, The satellite performs in this case signal processing including demodulation of the RF-signal received via the feeder link (FL), decoding of the demodulated RF-signal, re-encoding of the decoded signal and re-modulation the re-encoded signal transmitted via the serving link (SL) to the terrestrial wireless device at the signal reception side.

In a possible embodiment the communication links of the multi-link communication system comprise terrestrial network (TN) communication links and non-terrestrial network (NTN) communication links. Each communication link of the multi-link communication system comprises different communication link characteristics. The communication link characteristics of a communication link can e.g. comprise fading characteristics, bandwidth characteristics, latency characteristics and attenuation characteristics.

In a possible embodiment of the method analysing a performance of the multi-link communication system the encoded and compressed transmission data is distributed and transferred simultaneously as RF-signals over multiple independent communications links and/or multiple independent channels. The independent channels can be separated in the frequency domain or in the time domain.

Figure 3C:
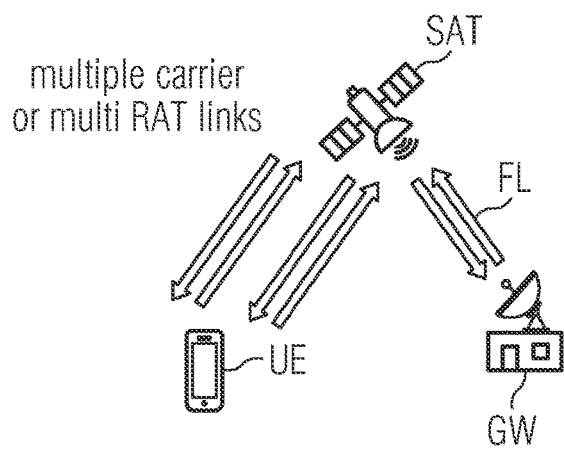
Figure 3D:
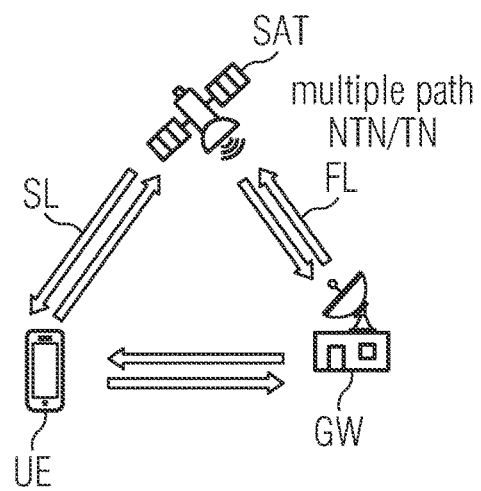
Figure 4:
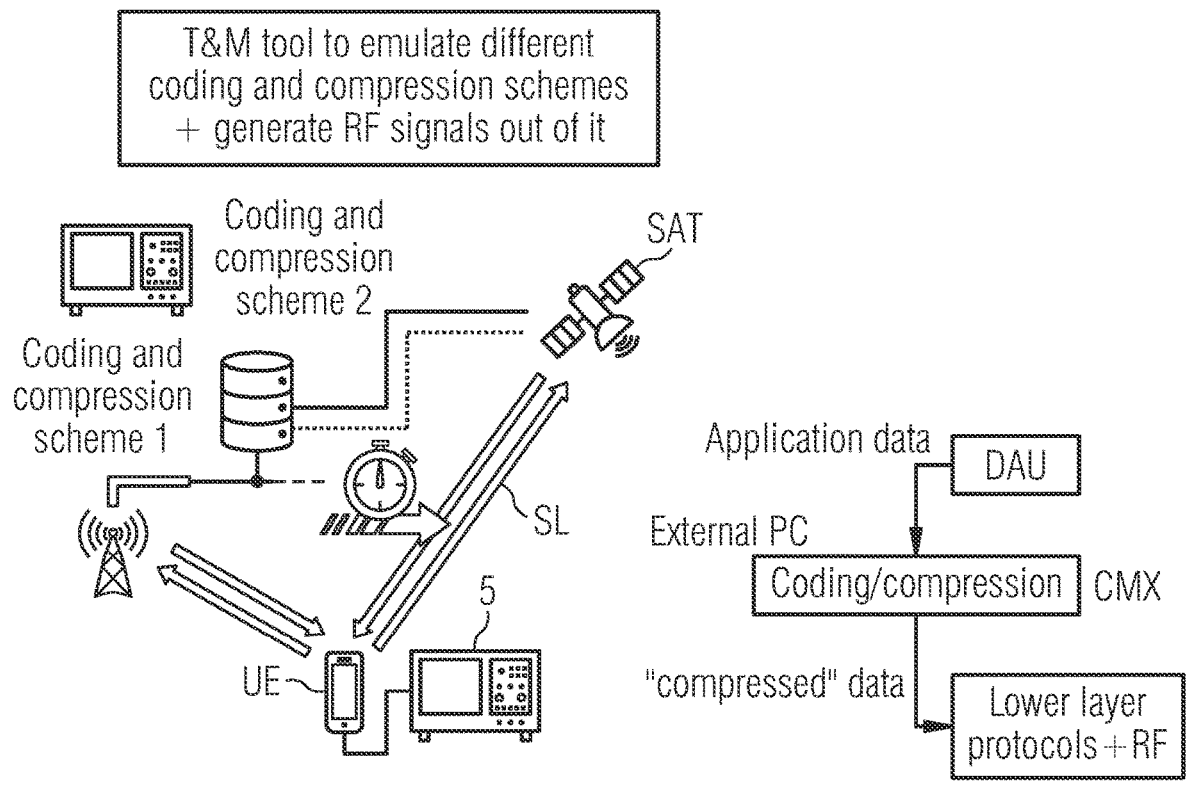
FIG. 4 shows a schematic diagram for illustrating a possible exemplary embodiment of a test system according to a further aspect of the present invention.

The invention further provides according to a second aspect a test system for testing a performance of a multi-link communication system as illustrated in FIGS. 2, 4. The multi-link communication system has multiple communication links including at least one non-terrestrial network (NTN) communication link as shown in the scenarios of FIGS. 3A to 3D.

FIG. 3A illustrates a non-terrestrial network (NTN) communication link including a feeder link FL, a satellite SAT and a serving link SL.

FIG. 3B illustrates a non-terrestrial network (NTN) communication link including a feeder link FL, an inter-satellite link ISL between a pair of satellites SAT1, SAT2 and a serving link SL.

FIG. 3C illustrates multiple carrier or multi RAT links between the user equipment and a satellite SAT a of a non-terrestrial network (NTN) communication link.

FIG. 3D illustrates a multi-path NTN/TN scenario.

In the test setup shown in FIG. 2 the non-terrestrial network (NTN) communication link comprises a feeder link FL and a serving link SL also referred to a service link. The feeder link FL is provided between a terrestrial gateway GW at the signal transmission side and a satellite SAT. The serving link SL is provided between the satellite SAT and the terrestrial wireless device UE at the signal reception side. Both the feeder link FL and the serving link SL of the non-terrestrial network (NTN) communication link shown in FIG. 2 comprise an associated uplink UL and an associated downlink DL respectively. The wireless device UE can be served by a cellular communication network by wirelessly transmitting and/or receiving signals from a radio access node.

The test system 1 shown in FIG. 2 comprises an encoding and compression stage 2B adapted to process transmission data at a signal transmission side of the test system 1 by emulating different encoding and compression schemes to provide encoded and compressed transmission data. The encoded and compressed data is converted by an RF generation unit 2C into radio frequency, RF, signals transferred via communication links of the multi-link communication system to a terrestrial wireless device UE at a signal reception side of the test system 1.

The transmission data supplied to the encoding and compression stage 2B of the test system 1 can comprise application layer data provided by a data application server (DAS) 2A. The application layer data can comprise video data and/or audio data. The encoded and compressed data is then converted by an RF signal generator 2C into radio frequency, RF, signals transferred via communication links of the investigated multi-link communication system to a terrestrial wireless device UE at a signal reception side 3.

A decoding and decompression stage 3B of the test system 1 at the reception side is adapted to apply corresponding decoding and decompression schemes to RF signals sampled by an RF sampling unit 3A to provide reception data at the signal reception side of the test system 1.

A data analysing unit 5 of the test system 1 is adapted to analyse a performance of the multi-link communication system by evaluating the reception data provided by the decoding and decompression stage 3B of the test system 1 to an application layer data processing stage 3C. The performance of the multi-link communication system can be analysed by evaluating predefined quality metrics of the reception data, i.e. the recovered application layer data. The evaluated quality metrics comprise for instance a data throughput, a block error rate, a latency and a Mean Opinion Score (MOS).

The SAN encoding and compression verification test system 1 illustrated in the embodiment of FIG. 2 consists mainly of two parts, i.e. a generating side 2 and a receiving side 3 which are interconnected for evaluation purpose. As a DUT a device that may perform dynamic encoding, compression or multi-link transmission is considered. The generation side 2B consists of the data application server (DAS) 2A, an encoding and compression stage 2B that can optionally be substituted by an external user configurable encoding stage (i.e. the user itself can execute the coding and compression) and finally by a signal generation stage 2C that converts the compressed and encoded data into a physical RF signal, i.e. a satellite feeder link radio interface.

The signal reception side 3 consists of a spectrum analyser function 3A that samples the RF signal and forwards it to a decoding and decompression stage 3B that applies the same algorithms as on the generator side. In case that at the generation side, the coding and compression is executed externally, the receiving side 3 does also provide an external function of reversing this process.

Different data evaluation criterions can be applied to evaluate the overall performance. These evaluation mechanisms can comprise processes like CRC based BLER evaluation, application quality analysis like MOS for voice or video. More sophisticated evaluation processes like application layer signal source coding with time stamps, watermarks or fingerprinting can be applied as well.

An advantage of the testing setup 1 illustrated in FIG. 2 or FIG. 4 is the combination of the generation, analysis and data evaluation stages in one common setup. The setup allows the evaluation of future satellite encoding stages that are required to perform dynamic signal encoding, decoding and compression steps. The test method according to the present invention allows a verification of the signal processing performance.

The applied method of encoding and compression verification in a multi-link scenario test system 1 extends the idea of the encoding and compression method verification by performing the encoding, compression and analysis stages under circumstances where multiple links are used and aggregated to transfer user data. A reason is that resilient networks and multicasting applications rely on the transmission of user data conducted over independent links like satellite links and terrestrial connections as well as multicasting scenarios where the data is transferred and aggregation over multiple independent channels. The independent channels can comprise different RAT channels in 6G networks, 5G TN and NTN channels, 5G channels separated on different frequency carriers or 5G channels where the data is separated in the time domain, i.e. deferred retransmissions.

The concept of the test setup or test system 1 as illustrated in FIG. 2 and FIG. 4 consists of two parts, a generating side 2 and a receiving side 3 which are interconnected for evaluation purpose. The DUT can be a wireless device or user equipment UE that performs the signal decoding, signal processing and combining stages. The generation side 2 can comprise a data application server (DAS) or application layer data source 2A, the encoding and compression stage 2B that can optionally be substituted by an external user configurable encoding stage and a signal generation stage 2C that converts the compressed and encoded data into a physical RF signal. An analysing unit 4 of the test system 1 can be provided on the generating side 2 connected to an analysing unit 5 of the test system 1 on the receiving side 3 to perform a comparison and evaluation of coding and compression mechanisms based on performance metrics. The analysing unit 4 on the transmission side 2 of the test system 1 can emulate feeder link (FL) encoding and compression schemes. The analysing unit 5 on the receiving side 3 can decode and decompress serving link (SL) encoding and compression schemes. Since the feeder link FL has normally a better RF performance (bandwidth, Doppler, path loss) than the serving link SL different coding and compression schemes can be applied for the feeder link FL and the serving link SL. A coding and compression scheme change and/or an adaption of the performance of the SAN can be verified by the test system 1.

Although the data application can comprise one or multiple parallel sources the test method or test method software tool allows a signal distribution over multiple links. The user can select either data multiplication and repetition/duplication or data separation with the objective of higher data rates. Typical scenarios can comprise either be a combined TN-NTN connection with terrestrial and non-terrestrial networks or can comprise multicast scenarios where the resilience is either provided by multi-link transmission over statistical independent links or via time-separated retransmissions.

The signal reception part 3 is in a possible embodiment less complex in case that the device under test DUT such as the user equipment UE is performing the steps of RF signal sampling, RF signal demodulation, decoding and decompression to provide application layer data. The application layer data is transferred to the test tool where the data quality analysing steps are executed, i.e., BLER evaluation on IP data, signal quality like MOS of video/voice or where user data latency tests are performed. The receiving side 3 comprises an RF signal sampling and demodulation stage 3A, a decoding and decompression stage 3B and an application layer data processing stage 3C as illustrated in FIG. 2. The analysing unit 5 on the reception side can be connected to the user equipment UE including stages 3A, 3B and 3C. In a possible embodiment the analysing unit 5 can include itself the stages 3A, 3B, 3C.

As also illustrated in FIG. 4 the testing system 1 provides a combination of the generation, analysis and data evaluation stages in one common setup. The setup allows the configuration of resilient data connections by applying individual signal encoding, compression stages and sending the data over independent multi-link where the links are statistically independent and provide independent link quality. In addition, the test setup also allows the verification of future multi-link multicast scenarios where the resiliency is provided by a time interrupted repetition of the data at longer time intervals. The analysing unit 5 on the receptions side 3 can analyse the performance of the independent joint coding on multi-link communications where data are sent over multiple links, wherein each link comprising different characteristics requiring the application of different coding and compression schemes. The coding and compression schemes may be changed during operation due to changing characteristics of the involved links. This change of schemes can be emulated as well by the test system 1. The analysing unit 4 can emulate different coding and compression schemes and generate from the encoded and compressed data RF signals. In a possible embodiment a sequence of different coding and compression schemes can be applied by a controller the test system 1 controlling stages 2A, 2B, 2C on the transmission side 2 and controlling stages 3A, 3B, 3C on the receiving side 3. Also different modulation schemes can be applied to emulate different scenarios. A user may select coding schemes, compression schemes and/or modulation schemes stored in data base of the test system 1 by means of a user interface UI of the test system 1. The user interface UI can be provided at a front panel of the analysing units 4, 5.

A multi-link communication system can apply multi-link scenarios and also resilient multicast. That means, data is either sent duplicated over multiple links or data is aggregated over multiple links. Each communication link may face different characteristics such as delay, bandwidth, fading, attenuation etc. The end user device UE needs to combine the data properly.

In a resilient multicast, there is no feedback but the transmission side ensures that the data is transferred properly. Data can be sent over multiple independent links or data is retransmitted within a certain time. This repetition time can be large, e.g. minutes or even hours. The reception side makes sure that the data is received properly.

The test method according to the present invention allows to emulate such scenarios from data provision up to RF signal generation. The data is also analysed at the receiver side to verify the data quality.

Figure 5:
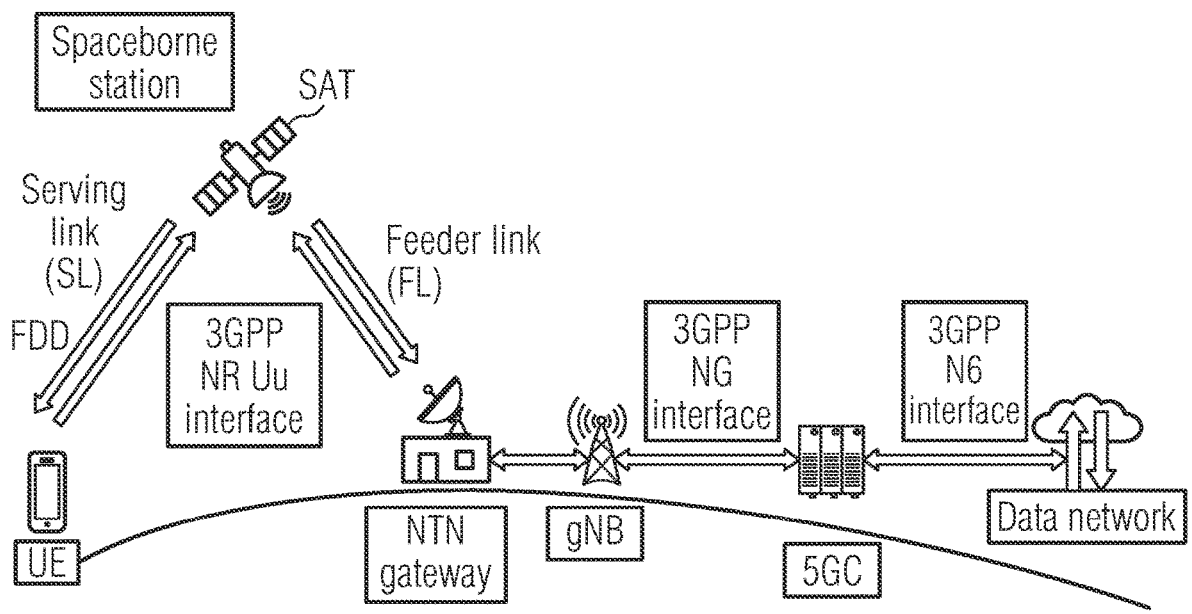
FIG. 5 illustrate an exemplary architecture of a multi-link communication system comprising a non-terrestrial network (NTN) communication link.

FIG. 5 illustrate an exemplary architecture of a multi-link communication system comprising a non-terrestrial network NTN. NTN can realize a seamless coverage by extending wireless connectivity to remote areas that lack access to traditional terrestrial networks. This enables people in remote areas to access essential services, connect with others and participate in the digital world. NTN can also enable satellite-based services such as two-way messaging, agricultural applications, e.g. precision farming and livestock monitoring, asset tracking, disaster response and recovery and remote monitoring.

The NTN architecture as illustrated in FIG. 5 comprises one or several satellite gateways GW that connect the NTN to a public data network, a feeder link or radio link FL between a satellite gateway GW and the satellite or a UAS platform, service link or radio link SL between the user equipment (UE) and the satellite or the UAS platform.

A satellite SAT or a UAS platform which may implement either a transparent or a regenerative (with on board processing) payload. The satellite SAT or the UAS platform typically generates several beams over a given service area bounded by its field of view. The footprints of the beams are typically of an elliptic shape. The field of view of the satellite or the UAS platform depends on the on board antenna diagram and the minimum elevation angle. Inter-satellite links (ISL) optionally exist in a constellation of satellites. This requires regenerative payloads on board the satellites. The ISL may operate in RF or optical bands. The user equipment UE is served by the satellite SAT or the UAS platform within the targeted service area.

A transparent payload is a payload that changes the frequency carrier of the uplink RF signal, filters and amplifies it before transmitting it on the downlink. Therefore, the waveform of the signal repeated by the transparent payload is not changed; in other words, the NTN with the transparent payload can be regarded as a relaying node at the network side. In a transparent architecture, the base station (gNodeB or gNB) is located on the ground behind the gateway GW, and the satellite's main purpose is to act as a repeater. The only processing that can be performed on the satellite SAT is radio frequency (RF) processing such as frequency conversion, amplification and beam management.

In contrast in a regenerative architecture, the satellite SAT carries either an entire gNB or parts of it, such as the radio unit which makes it possible to decode and process packets on the satellite SAT. The feeder link FL is in this case akin to a terrestrial front-haul/back-haul and it is not necessarily implemented using NR. The regenerative architecture provides more flexibility, better performance and global coverage due to the ability to support inter-satellite links ISLs. The regenerative payload is a payload that transforms and amplifies an uplink RF signal before transmitting it on the downlink. Further, the signal transformation encompasses digital processing of the signal, such as demodulation, decoding, re-encoding, re-modulation and filtering. With all these equivalent or similar functions as a base station, the NTN with the regenerative payload can be regarded as a base station at the network side.

Figure 6:
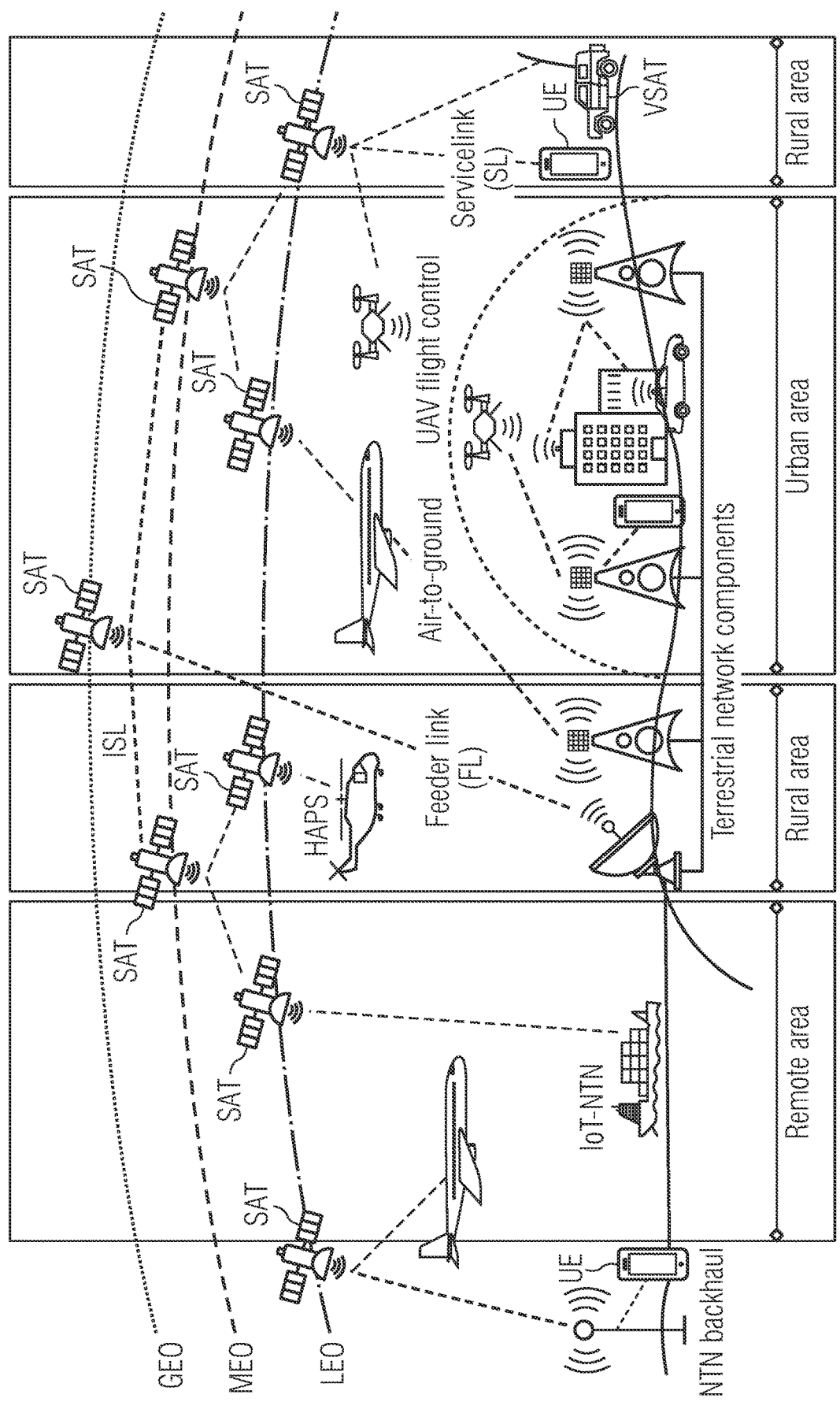
FIG. 6 illustrates a holistic view of a multi-link communication system including non-terrestrial network (NTN) communication links.

FIG. 6 shows a holistic view on a multi-link communication system comprising multiple communication links including non-terrestrial network (NTN) communication links. The test method and test system according to the present invention can emulate different multi-link scenarios to verify a sufficient performance of the multi-link communication system and a sufficient quality of the data on the reception side.

The invention claimed is:

1. A method for testing a performance of a multi-link communication system having multiple communication links including at least one non-terrestrial network (NTN) communication link, wherein the method comprises the steps of:
  processing transmission data at a signal transmission side by emulating different encoding and compression schemes to provide encoded and compressed transmission data converted into radio frequency, RF, signals transferred via communication links of the multi-link communication system to a terrestrial wireless device at a signal reception side;
  sampling the transferred RF signals at the signal reception side and applying corresponding decoding and decompression schemes to provide reception data; and
  analysing a performance of the multi-link communication system by evaluating the provided reception data.

2. The method for testing a performance of a multi-link communication system according to claim 1 wherein analysing a performance of the multi-link communication system is performed by evaluating predefined quality metrics of the reception data.

3. The method for testing a performance of a multi-link communication system according to claim 2 wherein the evaluated quality metrics comprise a data throughput, a block error rate, a latency and a Mean Opinion Score (MOS).

4. The method for testing a performance of a multi-link communication system according to claim 1 wherein the non-terrestrial network (NTN) communication link of the multi-link communication system comprises a feeder link (FL) provided between a terrestrial gateway at the signal transmission side and a satellite and comprises a serving link (SL) between the satellite and the terrestrial wireless device at the signal reception side.

5. The method for testing a performance of a multi-link communication system according to claim 4 wherein the non-terrestrial network (NTN) communication link of the multi-link communication system comprises at least one inter-satellite link (ISL) between a pair of satellites of the non-terrestrial network (NTN) communication link.

6. The method for testing a performance of a multi-link communication system according to claim 4 wherein both the feeder link (FL) and the serving link (SL) of the non-terrestrial network (NTN) communication link comprise an uplink (UL) and a downlink (DL) respectively.

7. The method for testing a performance of a multi-link communication system according to claim 4 wherein the satellite of the non-terrestrial network (NTN) communication link of the multi-link communication system provides a regenerative payload performing signal processing including demodulation of the RF-signal received via the feeder link (FL), decoding of the demodulated RF-signal, re-encoding of the decoded signal and re-modulation the re-encoded signal transmitted via the serving link (SL) to the terrestrial wireless device at the signal reception side.

8. The method for testing a performance of a multi-link communication system according to claim 1 wherein the communication links of the multi-link communication system comprise terrestrial network (TN) communication links and non-terrestrial network (NTN) communication links.

9. The method for testing a performance of a multi-link communication system according to claim 1 wherein for each communication link of the multi-link communication system a different encoding and compression scheme is applied to the transmission data.

10. The method for testing a performance of a multi-link communication system according to claim 1 wherein each communication link of the multi-link communication system comprises different communication link characteristics.

11. The method for testing a performance of a multi-link communication system according to claim 10 wherein the communication link characteristics of a communication link comprise fading characteristics, bandwidth characteristics, latency characteristics and attenuation characteristics.

12. The method for testing a performance of a multi-link communication system according to claim 1 wherein the transmission data comprises application layer data provided by a data application server.

13. The method for testing a performance of a multi-link communication system according to claim 12 wherein the application layer data comprises video data and/or audio data.

14. The method for testing a performance of a multi-link communication system according to claim 1 wherein the applied encoding and compression schemes are executed by an encoding and compression stage at the signal transmission side.

15. The method for testing a performance of a multi-link communication system according to claim 14 wherein the encoding and compression schemes applied for different communication links of the multi-link communication system are configured by a user.

16. The method for testing a performance of a multi-link communication system according to claim 1 wherein the applied decoding and decompression schemes are executed by a decoding and decompression stage at the signal reception side.

17. The method for testing a performance of a multi-link communication system according to claim 1 wherein the encoded and compressed transmission data is distributed and transferred simultaneously as RF-signals over multiple independent communications links and/or multiple independent channels.

18. The method for testing a performance of a multi-link communication system according to claim 17 wherein the independent channels are separated in the frequency domain or in the time domain.

19. A test system for testing a performance of a multi-link communication system having multiple communication links including at least one non-terrestrial network (NTN) communication link, said test system comprising:
an encoding and compression processor configured to process transmission data at a signal transmission side of the test system by emulating different encoding and compression schemes to provide encoded and compressed transmission data;
an RF transmitter path configured to convert processed transmission data into radio frequency, RF, signals via communication links of the multi-link communication system, including at least one NTN communication link, to a terrestrial wireless device to a terrestrial wireless device at a signal reception side of the test system;
a reception-side sampling module configured to sample RF signals received at the signal reception side of the test system;
a decoding and decompression processor configured to apply corresponding decoding and decompression schemes to sampled RF signals to provide reception data; and
a performance-analysis processor configured to analyse a performance of the multi-link communication system by evaluating the reception data.

20. A test tool comprising processing circuitry and RF front-end circuitry, the processing circuitry being configured to:
process transmission data at a signal transmission side by emulating different encoding and compression schemes;
control an RF transmitter path to convert into radio frequency, RF, signals and to transfer the RF signals via communication links of the multi-link communication system, including at least one non-terrestrial network (NTN) communication link, to a terrestrial wireless device at a signal reception side;
obtain the transferred RF signals from an RF receiver path and a sampling module at the signal reception side and apply corresponding decoding and decompression schemes to provide reception data; and
analyse a performance of the multi-link communication system by evaluating the provided reception data.

* * * * *